US010026327B2

(12) United States Patent
Prenot et al.

(10) Patent No.: US 10,026,327 B2
(45) Date of Patent: Jul. 17, 2018

(54) MANAGING THE TRAJECTORY OF AN AIRCRAFT IN CASE OF ENGINE OUTAGE (71) Applicant: THALES, Courbevoie (FR)

(72) Inventors: Franck Prenot, Toulouse (FR); Sonia Vautier, Toulouse (FR); Philippe Chaix, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/344,775

(22) Filed: Nov. 7, 2016

(65) Prior Publication Data
US 2017/0132939 A1 May 11, 2017

(51) Int. Cl.
B64D 45/00 (2006.01)
G08G 5/00 (2006.01)

(52) U.S. Cl.
CPC ........... G08G 5/0065 (2013.01); B64D 45/00 (2013.01); G08G 5/0039 (2013.01); G08G 5/0091 (2013.01); B64D 2045/0085 (2013.01)

(58) Field of Classification Search
CPC .. G08G 5/0065; G08G 5/0039; G08G 5/0091; B64D 45/00; B64D 2045/0085; G05D 1/0661
See application file for complete search history.

(56) References Cited

U.S. PATENT DOCUMENTS

| 7,996,121 B2* | 8/2011 | Ferro | G01C 23/00 244/183 |
| 2008/0071434 A1* | 3/2008 | Fortier | G08G 5/0034 701/15 |
| 2011/0082605 A1 | 4/2011 | Coulmeau et al. | |

FOREIGN PATENT DOCUMENTS

| FR | 2 854 948 A1 | 11/2004 |
| FR | 2 949 897 A1 | 3/2011 |
| FR | 2 953 301 A1 | 6/2011 |

* cited by examiner

Primary Examiner — Michael J Zanelli
(74) Attorney, Agent, or Firm — Baker & Hostetler LLP (57) ABSTRACT A method for managing the trajectory of an aircraft implemented by computer comprises the steps consisting of: receiving the aeroplane performance levels, receiving a flight plan, receiving ground relief data, receiving weather data, determining the coordinates of a safety point according to the aeroplane performance levels, the relief data and the weather data, the safety point making it possible to continue the flight according to a predefined SID landing trajectory in case of outage of one or more engines of the aircraft. Developments are described, notably in computation of the spatial coordinates of the safety point, the management of several safety points and/or of EOSID trajectories, the insertion or the activation of an EOSID trajectory including in the absence of engine outage, the management of the Disarm Point flight plan point. System and software aspects are described.

19 Claims, 8 Drawing Sheets

MANAGING THE TRAJECTORY OF AN AIRCRAFT IN CASE OF ENGINE OUTAGE

CROSS-REFERENCE TO RELATED APPLICATIONS

This application claims priority to foreign French patent application No. FR 1502341, filed on Nov. 6, 2015, the disclosure of which is incorporated by reference in its entirety.

FIELD OF THE INVENTION

The invention relates to the technical field of the management of the trajectory of an aircraft, in particular in case of outage of one or more engines.

BACKGROUND

In any aircraft, one or more engines can drop out, notably on take-off.

In case of engine outage on take-off, a specific trajectory is defined (trajectory or procedure called EOSID for Engine Out—SID), by contrast with the standard departure procedure without outage called SID.

For the current aircraft, the EOSID trajectories are defined by the airlines for each type of carrier using performance computation tools supplied by the aircraft manufacturers, covered by the civil aviation authorities of the country concerned, to manage the engine outage situations on take-off. These procedures are stored in the navigation databases and are associated with a runway.

The EOSID trajectories generally aim to find a lateral trajectory that makes it possible to avoid obstacles, with a climb gradient that is degraded (because of the engine outage).

Generally, to characterize such EOSID trajectories, aeronautical practices consider a point called point of "divergence". If this (lateral) trajectory point exists, it is a point from which the EOSID diverges from the SID in terms of "coding" of legs (i.e. of flight plan segments).

Another point is called "disarm" point, and can be defined by the "Disarm Point" according to the ARINC 424 aeronautical standard. This point associated with an EOSID procedure can be used as spatial reference, once sequenced, for the deactivation of the automatic insertion of the EOSID procedure in case of engine outage.

Several technical problems arise with respect to the use of these EOSID trajectories.

In case of engine outage on take-off, if an EOSID is defined, a temporary flight plan is proposed to the pilot. The temporary flight plan makes it possible to rejoin that of the EOSID, as long as the aeroplane is on the common part of the trajectories of the SID (Standard Instrument Departure procedure) and the EOSID (Engine Out—SID procedure). The pilot therefore has the responsibility of accepting or rejecting this temporary flight plan, without, however, knowing, in certain situations, if he or she could follow the standard procedure in safety (according to the aeroplane performance levels, the relief, etc.).

Moreover, once on board, the pilot does not have the option to modify an EOSID procedure, which is associated with a runway. Now, on a same runway, several departure procedures may be possible. In certain cases, the EOSID will not be compatible with the leg coding characteristics (e.g. course, etc.) of the active take-off procedure although the pilot will have to fly it if an engine outage is declared. In this precise case, the procedure will not be activated and the pilot must manually follow this procedure.

In other words, the safe procedures in case of engine outage (EOSID) do not exist for all departures. Only some airlines create these procedures for certain airports for each type of aeroplane. These procedures must be checked every 28 days and potentially redefined if the linked departure procedure is modified even very slightly. It should be noted that the engine outage procedure is systematically prepared for each departure. These days, the pilots draw the procedure on a paper or electronic medium and retain this procedure throughout the departure procedure.

The use of the procedures is in fact limited in the current aircraft. The size of the database, the work load of the airline necessary to the construction of the procedure and the maintenance of this procedure according to the new aeroplane performance databases or navigation databases (delivered every 28 days), often limit the use of these procedures.

In the current aircraft, an EOSID procedure is automatically proposed only if the engine outage is detected before the point of divergence between the standard take-off procedure (SID) and the take-off procedure in case of engine outage (EOSID). Consequently, if the engine outage is detected after the point of divergence, the EOSID is not proposed automatically and the pilot must define it manually in a stress situation. This aspect is problematical notably in case of an error present in the navigation database (for example in case of updating of the SID and not of the EOSID) where a point of divergence would no longer be defined.

The patent literature, for example FR2953301, does not provide appropriate solutions for the technical problems mentioned.

There is a need for procedures and systems that make it possible to assist the pilot in an engine outage procedure on take-off.

SUMMARY OF THE INVENTION

The present invention relates to a method for managing the trajectory of an aircraft implemented by computer comprising the steps consisting in receiving the aeroplane performance levels, receiving a flight plan, receiving ground relief data, receiving weather data, determining the coordinates of a safety point according to the aeroplane performance levels, the relief data and the weather data, said safety point making it possible to continue the flight according to a predefined SID landing trajectory in case of outage of one or more engines of the aircraft. Developments are described, notably in computation of the spatial coordinates or the safety point, the management of several safety points and/or of EOSID trajectories, the insertion or the activation of an EOSID trajectory including in the absence of engine outage, the management of the Disarm Point flight plan point. System and software aspects are described.

A computer-implemented method is disclosed for managing the trajectory of an aircraft comprising the steps consisting in receiving the aeroplane performance levels of the aircraft, receiving a flight plan of the aircraft, receiving ground relief data associated with the flight plan, receiving weather data associated with the flight plan, the weather data comprising data on the winds and/or the temperatures associated with the flight plan, determining the coordinates of at least one safety point according to the aeroplane performance levels, the data associated with the ground relief and the weather data, said safety point making it possible to continue the flight of the aircraft according to the predefined SID landing trajectory in case of outage of one or more engines of the aircraft.

The aeroplane performance levels designate all the values characterizing the aeroplane for its flight (e.g. take-off velocity, limit velocity, take-off weight, take-off runway length, and other such values).

In a development, the step consisting in determining the coordinates of at least one safety point comprises the steps consisting in determining the position and the altitude of the aircraft relative to the relief, receiving a value of a minimum safety height associated with the crossing of the relief, and determining the performance levels of the aeroplane according to the engine outage and the weather data.

In a development, the method further comprises the step consisting in displaying at least one safety point.

The safety point will be indicated visually or graphically to the pilot, for example by the display of a symbol on the ND and/or VD.

In a development, the method further comprises the step consisting in receiving one or more EOSID trajectories, an EOSID trajectory being associated with a take-off runway and/or with an SID trajectory.

The EOSID trajectory comprises a lateral trajectory, flown with a degraded gradient relative to a trajectory without engine outage.

In a development, an EOSID trajectory is selected from several according to predefined criteria.

An EOSID trajectory can be created from scratch by the pilot. The pilot can also select one or more EOSID trajectories from predefined trajectories. A computerized system can also perform this selection or assist the pilot in this selection (for example, the candidate EOSID trajectories are compared using predefined criteria (quantification of the safety, of the flyability, of the fuel consumption, etc.) and the EOSID trajectory having the highest score in light of these criteria can be selected manually by the person and/or automatically by the machine).

In a development, the display of an EOSID trajectory comprises lateral trajectory steps.

If an EOSID is defined, as long as there is no engine outage detected, the display of the trajectory of the EOSID will advantageously and preferably be displayed in the form of a complete trajectory (including the steps between the legs).

The pilot can edit and/or view at least one of the trajectory segments of the EOSID trajectory. This viewing and editing of the EOSID segments can notably be performed on the FMD. The method makes it possible to display the segments of the EOSID portion (legs) on the FMD (for example in the F-PLN or in an EOSID-specific FMS page), in order to allow the pilot to be able to modify this EOSID procedure.

In a development, a plurality of safety points is determined, each safety point being associated with an increasing number of engines out.

In a three-engine or more case, several safety points will be computed according to the number of engines out (1 EO, 2 EO, 3 EO, etc.), to the exclusion of the situation whereby all the engines are out, (since then, the aeroplane lands according to the trajectory that remains possible given the delicacy thereof).

In a development, the method further comprises the step consisting in inserting into a temporary flight plan or in activating in the current flight plan an EOSID trajectory.

This insertion or activation is possible before, and in particular after, the point of divergence, the point of divergence being the point from which a segment of the EOSID trajectory of the aircraft differs from the segment of the SID trajectory without engine outage (i.e. the trajectories diverge in terms of coding of trajectory segments).

In case of engine outage on take-off, a flight plan will be proposed making it possible to rejoin the EOSID, and even if the point of divergence is passed, leaving the choice to the pilot to accept or reject this flight plan.

The pilot can create EOSID procedures manually. He or she can create his or her backup plan and validate it as EOSID. He or she can select a pre-existing trajectory and modify it to make an EOSID trajectory therefrom.

The pilot can create his or her own EOSID trajectories. The method makes it possible to create a procedure even if it does not exist in the database of the system, by guaranteeing the same possibilities of automatic activation.

In a development, the method further comprises a step consisting in detecting an engine outage and in revising the flight plan of the aircraft by inserting the temporary flight plan specific to an EOSID trajectory.

The method makes it possible to identify a secondary "EOSID" flight plan. This will enable the pilot to prepare his or her EOSID in a secondary flight plan which will automatically be activated (in the temporary flight plan) in case of engine outage.

In a development, the method further comprises a step consisting in activating an EOSID trajectory in the absence of engine outage.

The method allows the pilot to be able to activate the EOSID procedure even if no engine outage is detected by the system (problem as to the outage detection, etc.).

In a development, a plurality of EOSID trajectories is associated with a predefined take-off runway and/or an SID trajectory.

The method makes it possible to store and display a number of EOSID trajectories for a same runway according to the departure selected or the point of engine outage. This EOSID will either be activated automatically or be able to selected by the pilot.

In the present document, the expression "EOSID" can be replaced by the expression "EO Missed Approach": in other words, the same systems and methods can be applied to a missed approach procedure. An engine outage trajectory (EO Missed Approach) can therefore in particular be associated with a missed approach procedure.

The method makes it possible to associate an engine outage procedure with a missed approach procedure, with the same properties as an EOSID associated with the take-off procedure (storage, display and activation). The missed approach procedure is defined in a database and can be activated automatically in case of missed approach.

In a development, the method further comprises a step consisting in displaying a predefined point, called Disarm Point, determining the activation of an EOSID trajectory in case of engine outage of the aircraft before this point on the flight plan.

The "Disarm Point" is defined in the ARINC A424-20 standard (§ 5.17). It is a predefined fixed point, defined in the database and which is associated with an EOSID trajectory. In case of engine outage before this point, the flight management system can activate (automatically) the backup EOSID trajectory. After this point, the system can no longer propose the automatic activation of the EOSID. This "Disarm" point can be indicated visually to the pilot, for example by the display of a label or symbol.

A computer program product is disclosed, said computer program comprising code instructions making it possible to perform one or more of the steps of the method, when said program is run on a computer.

A system is disclosed comprising means for implementing one or more of the steps of the method.

In a development, the system comprises one or more FMD and/or ND display screens and/or an electronic flight bag EFB.

In a development, the system comprises virtual and/or augmented reality means.

Complementing—or replacing—screens of the onboard FMS computer and/or EFB, additional HMI means can be used. Among these advanced HMIs, some embodiments of the invention can be implemented by augmented reality AR means (e.g. projectors, glasses, etc.) and/or virtual reality VR means (e.g. visor, head-mounted display, etc.). Some embodiments can be mixed or hybrid AR/VR or, in other words, combine EVS, an acronym for "Enhanced Vision System", and/or SVS, an acronym for "Synthetic Vision System", means. For example, projection means can project the information onto the windshield and/or internal elements of the cockpit of the aircraft.

Advantageously, the embodiments of the invention make it possible to assist the pilot in an engine outage procedure on take-off at the time of ground preparation (briefing), at the moment of decision-taking in case of engine outage and/or at the moment of the change of trajectory.

Advantageously, during the ground preparation for the flight, the pilot can link an EOSID procedure (constructed manually, selected from several and possibly modified, etc.) to an SID procedure published and contained in the database. This constructed EOSID procedure can be displayed and activated in the same way as an EOSID procedure contained in the database.

Advantageously, the invention constitutes an aid to the preparation of the flight on the ground. The pilot can directly create a procedure if it does not exist in the database of the system and save it by associating it with the departure runway. This procedure will notably be able to be activated automatically in case of engine outage. The pilot can preview the engine outage safety point computed by the system according to real-time parameters of the aeroplane before conducting an effective briefing before take-off.

Advantageously, an embodiment of the invention allows for the creation of EOSID by the pilot, with an EOSID for each departure, according to an outage processing operation that is identical in all cases. This embodiment therefore improves the safety of the flight while lightening the workload of the pilot.

Advantageously, a safety point is determined that makes it possible to assist the pilot in his or her decision-making in case of engine outage. In case of engine outage before this safety point, the pilot will know that he or she will not be able to continue the standard SID procedure in complete safety with regard to the relief; he or she will have to activate the EOSID or follow an adapted procedure. In case of engine outage after the safety point, the pilot will know that he or she can follow the SID in safety with regard to the relief; he or she will be able to choose to continue the SID, activate the EOSID or follow an adapted procedure. The computation of the safety point will have to take into account the obstacles contained in a terrain or safety altitude database.

Advantageously, the pilot can textually check the EOSID procedure since, in an embodiment, this procedure is displayed in the form of textual legs, like the departure and arrival procedures on the FPLN page.

Advantageously, an embodiment of the invention allows the pilot to revert to the EOSID procedure when the aeroplane has passed the point of divergence between the SID and the EOSID.

Advantageously, the invention constitutes an aid to the decision-making of the pilot. In case of engine outage, the pilot can clearly view the engine outage safety point according to the real-time parameters of the aeroplane (position, velocity, weight, etc.).

Advantageously, an embodiment of the invention allows for the determination and display of a realistic trajectory of the EOSID, on the ground and during the departure procedure, even without engine outage, in order to be able to prepare and anticipate the procedure to be followed in case of engine outage. This trajectory is computed fully (with the lateral steps and not as pseudo-trajectory which would show only the legs without steps), by making engine outage performance assumptions.

Advantageously, the determination of the safety point can be performed in real time or quasi-real time (for example using a terrain or safety altitude database), which makes it possible to warn the pilot on any trajectory (including in fixed heading holding mode, e.g. HDG or TRK).

Advantageously, an embodiment of the invention makes it possible to activate the EOSID trajectory on engine outage, at any moment of the departure procedure (whether before or after the point of divergence).

Advantageously, the invention allows the pilot to insert the EOSID trajectory, which allows him or her to modify it notably in the cases i) where the point of divergence computed by the FMS is different from and prior to the published operational point of divergence (i.e. in the case where legs of the SID would be updated in NavDB and not those of the SID) or ii) where the legs of the SID and of the EOSID are very close after the point of divergence.

Advantageously, the EOSID trajectory on engine outage can be activated at any moment of the departure procedure (whether before or after the point of divergence between the SID and EOSID).

Advantageously, the automatic activation of an EOSID trajectory according to the invention can be performed with no strict condition of consistency of the coding of segments between the EOSID procedure and the standard SID procedure, which makes it possible to obtain a safe trajectory which is not linked to a system limitation (navigation database content).

Advantageously, the invention contributes to securing the safety of the trajectory of the aircraft. The system can for example automatically propose a safe trajectory in case of engine outage, at any moment during the flight of the departure procedure. This improves safety in a situation that is highly stressful through its rarity and dangerousness.

Advantageously, the invention will apply to any system making it possible to compute aeroplane performance levels with an engine outage configuration and taking into account the aeroplane data in real time. Notably, the invention can be incorporated in a computer of FMS type which can notably very accurately compute the aeroplane performance levels.

BRIEF DESCRIPTION OF THE DRAWINGS

Other features and advantages of the invention will become apparent from the following description and the figures of the attached drawings in which.

DETAILED DESCRIPTION

To simplify the understanding of the description of certain embodiments of the invention, technical terms and environments are defined hereinbelow.

The acronym or symbol SID corresponds to the expression "Standard Instrument Departure Procedure", which is a procedure to be followed on departure from an airport by an aircraft moving in IFR flight conditions. By extension, SID designates the trajectory associated with this procedure.

The acronym or symbol EOSID corresponds to the expression "Engine Out SID", which is the departure procedure to be followed in case of engine outage. By extension, EOSID designates the trajectory associated with this procedure.

The "point of divergence" is the point (coordinates in space) at which (the trajectory of) the EOSID diverges laterally from the SID. Before the point of divergence, the SID and the EOSID have the same segments.

The acronym or symbol EFB corresponds to the term "Electronic Flight Bag" and designates onboard electronic libraries. An EFB is a portable electronic apparatus used by the navigating crew.

The acronym or symbol FMS corresponds to the term "Flight Management System" and designates the flight management systems of the aircraft. In the preparation of a flight or upon a diversion, the crew proceeds to input different information relating to the progress of the flight, typically by using a flight management device of an aircraft, FMS. An FMS comprises input means and display means, as well as computation means. An operator, for example the pilot or the co-pilot, can input, via the input means, information such as RTAs, or "waypoints", associated with waypoints, that is to say points in vertical alignment with which the aircraft must pass. The computation means notably make it possible to compute, from the flight plan comprising the list of the waypoints, the trajectory of the aircraft, according to the geometry between the waypoints and/or the altitude and velocity conditions.

The acronym HMI corresponds to Human-Machine Interface. The inputting of the information, and the display of the information input or computed by the display means constitute such a human-machine interface. With known devices of FMS type, when the operator inputs a waypoint, he or she does so via a dedicated display displayed by the display means. This display can possibly also display information relating to the situation in time of the aircraft with regard to the waypoint concerned. The operator can then input and view a time constraint posed for this waypoint. Generally, the HMI means make it possible to input and consult flight plan information, piloting data, etc.

The pilot of an aircraft or aeroplane uses the flight plan information in a number of contexts: in avionics equipment by means of the FMS (Flight Management System) and/or by means of the EFB (Electronic Flight Bag), for example of tablet type. In the current avionics systems, the flight plan is generally prepared on the ground by the mission planner, for example by using a tool called "Flight Planning System". A part of the flight plan is transmitted to air traffic control for validation. The flight plan is finally entered into the FMS.

The "flight levels" are flight altitudes. The flight levels authorized for cruising are dictated by air navigation control. The altitude values are discretized. The flight levels are measured in multiples of 100 feet. Conventionally, the flight levels authorized at high altitude are multiples of 1000, 2000 or 4000 feet (ft). For example in certain areas, the odd flight levels (29 000 feet/FL290, 31 000 feet/FL310, etc.) are authorized in the West to East direction and the even flight levels (30 000 ft/FL300, 32 000 ft/FL320, etc.) are authorized in the East to West direction.

A "step" corresponds to a change of flight level (FL, for "Flight Level"). A "change of flight level" (or "step" or "step between levels") is a portion of trajectory describing the change from one level performed at a given flight level to the next (e.g. which can be above or below the current flight level).

A "route" comprises in particular a list of non-geo-referenced identifiers making it possible to describe the trajectory of the aircraft.

A "flight plan" notably comprises a list of geo-referenced objects associated with the identifiers of the route. A flight plan can generally be represented graphically by a succession (not necessarily continuous) of "segments" (or "flight portions" or "trajectory elements").

A "trajectory" is generally defined as a continuous path, described in 3 dimensions or more (spatial dimensions as to the positions, but also velocities, times, weight, etc.), corresponding to a data set describing the trend of a plurality of physical parameters of the aeroplane, as well as their measurement dynamics, or according to the flight plan.

Figure 1:
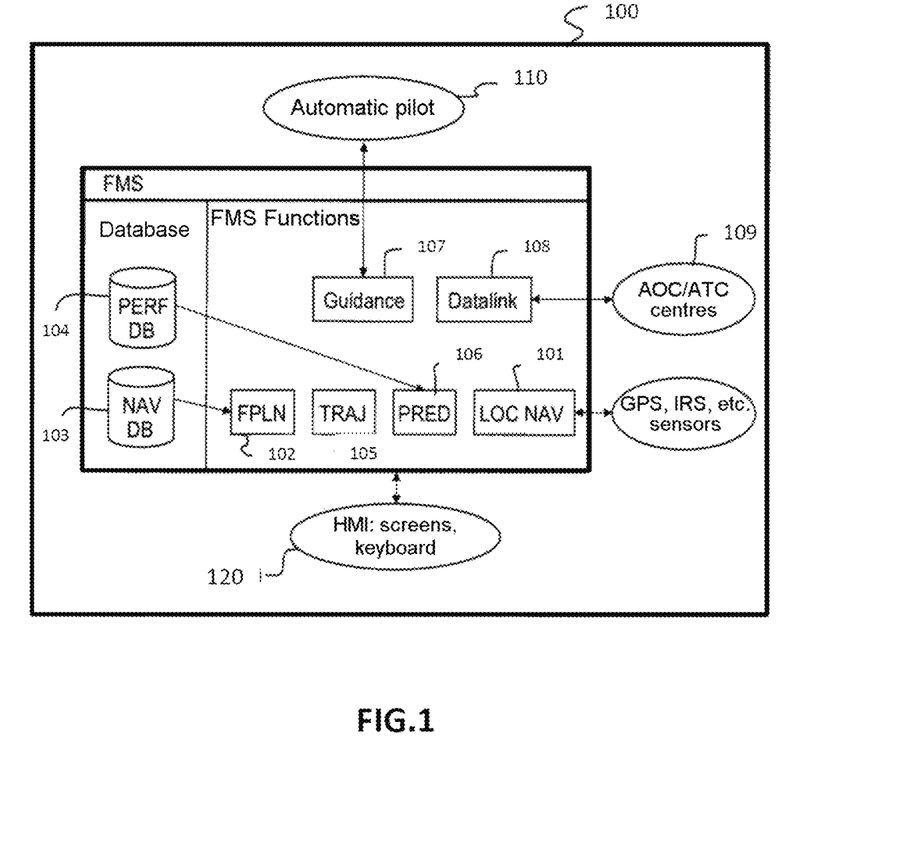
FIG. 1 schematically illustrates the structure and the functions of a flight management system of known FMS type.

FIG. 1 schematically illustrates the structure and the functions of a flight management system of known FMS type. A system of FMS type 100, arranged in a cockpit, has a human-machine interface 120 comprising input means, for example formed by a keyboard, and display means, for example formed by a display screen, or even simply a touch display screen, as well as at least the following functions:

Navigation (LOCNAV) 101, for performing the optimum location of the aircraft according to geolocation means 130 such as satellite geo-positioning or GPS, GALILEO, VHF radio navigation beacons, inertial units. This module communicates with the abovementioned geo-location devices;

Flight plan (FPLN) 102, for inputting the geographic elements that make up the "skeleton" of the route to be followed, such as the points imposed by the departure and arrival procedures, the waypoints, the air corridors, commonly called "airways". The method and systems described affect or relate to this part of the computer;

Navigation database (NAVDB) 103, for constructing geographic routes and procedures from data included in the bases relating to the points, beacons, intersection or altitude legs, etc.;

Performance database (PERFDB) 104, containing the aerodynamic and engine parameters of the aircraft;

Lateral trajectory (TRAJ) 105, for constructing a continuous trajectory from the points of the flight plan, observing the performance levels of the aircraft and the required navigation performance (RNP) constraints;

Predictions (PRED) 106, for constructing an optimized vertical profile on the lateral and vertical trajectory and giving the distance, time, altitude, velocity, fuel and wind estimations notably on each point, at each change of piloting parameter and at destination, which will be displayed to the crew. The methods and systems described affect or relate primarily to this part of the computer;

Guidance (GUID) 107, for guiding the aircraft in the lateral and vertical planes on its three-dimensional trajectory, while optimizing its velocity, using information computed by the predictions function 206. In an aircraft equipped with an automatic piloting device 210, the latter can exchange information with the guidance module 207;

Digital data link (DATALINK) 108 for exchanging flight information between the flight plan/predictions functions and the control centres or other aircraft 109;

One or more screens, notably the so-called FMD, ND and VD screens.

The FMD (Flight Management Display) is an interface, generally a display screen, that can be interactive (for example a touch screen), making it possible to interact with the FMS (Flight Management System). For example, it makes it possible to define a route and trigger the computation of the flight plan and of the associated trajectory. It also makes it possible to consult the result of the computation in text form.

The ND (Navigation Display) is an interface, generally a display screen, that can be interactive (for example a touch screen), making it possible to consult, in two dimensions, the lateral trajectory of the aeroplane, seen from above. Different viewing modes are available (rose, plane, arc, etc.) and according to different scales (configurable).

The VD (Vertical Display) is an interface, generally a display screen, that can be interactive (for example a touch screen), making it possible to consult, in two dimensions, the vertical profile, projection of the trajectory. As for the ND, different scales are possible.

All of the information entered or computed by the FMS is grouped together on different display screens (FMD pages, NTD and PFD "display devices", HUD or similar). The HMI component of the FMS structures the data for sending to the display screens (called CDS, for Cockpit Display System). The CDS itself, representing the screen and its graphic driving software, performs the display of the drawing of the trajectory, and also includes the pilots making it possible to identify the movements of the finger (if touch type) or of the pointing device.

In an embodiment provided by way of example, the new revision according to the invention can be partly performed by the HMI part, which displays the revision menu and calls the FPLN component which performs the modification of the flight plan. The TRAJ and PRED components then recompute the new trajectory and the new predictions, which are displayed by the HMI part.

Figure 2:
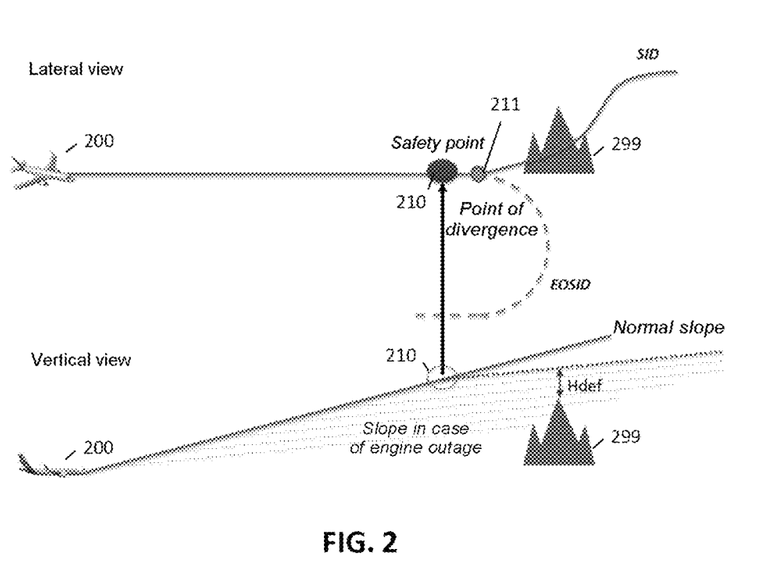
FIG. 2 illustrates an example of a step of the method according to the invention.

FIG. 2 illustrates examples of steps of the method according to the invention. The figure shows, in side view and in vertical view, the trajectory of an aircraft 200 up to the safety point 210 determined according to the invention, in case of engine outage. The point of divergence 211 is indicated in the figure.

Advantageously according to the invention, the safety point 210 is a "real" safety point in case of engine outage: this point represents the moment from which, even if an engine outage occurs, the airplane can continue to fly the departure procedure in safety relative to the relief 299.

The computation of performance level with an engine outage to take the gradient necessary to cross an obstacle is not known in real time by the pilot. The invention specifically and notably makes it possible to notify the pilot as the moment to which he or she can continue to fly the standard departure procedure (SID) in safety rather than the specific trajectory defined in case of engine outage (EOSID). This is represented by the safety point 210 in engine outage situation.

The method notably comprises a step consisting in determining a safety point 210 which enables the pilot to know the moment at which the continuation of the flight on the SID is possible in case of engine outage. In one embodiment, the computation of this safety point 210 takes into account one or more obstacles 299 (for example, as determined in a terrain or safety altitude database).

Different methods for computing the safety point 210 are possible.

Figure 3:
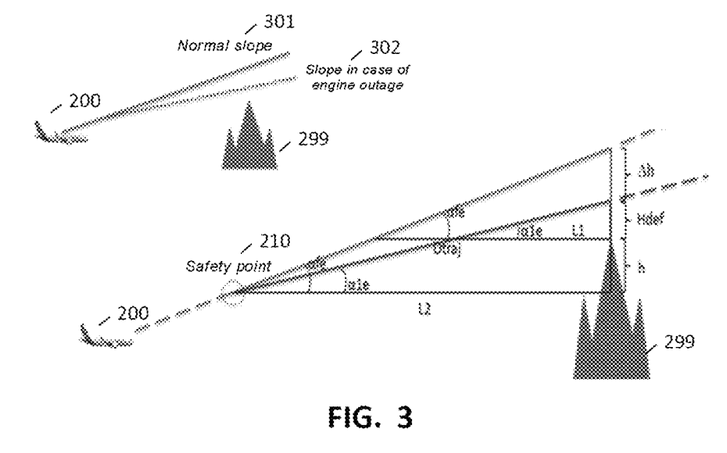
FIG. 3 illustrates an example of determination of the safety point according to the invention in case of engine outage.

FIG. 3 illustrates an example of determination of the safety point according to the invention in case of engine outage.

In an embodiment, the property of the altitude of the safety point 210 is determined by taking into account trajectory slopes with engines operational and one engine out. The crossing height datum Hdef ("safety height") leads to the definition of the altitude of the safety point 210.

It may be that there is no safety point, i.e. one that can meet the crossing constraints given the climb gradient.

Figure 4:
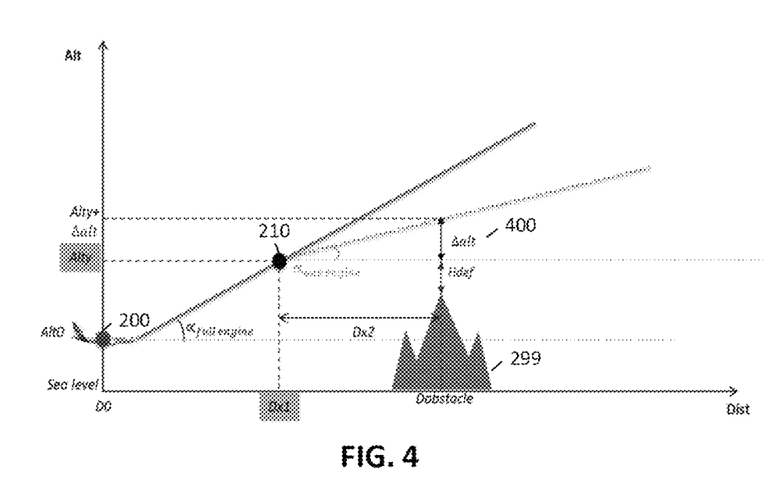
FIG. 4 illustrates an another example of determination of the safety point according to the invention in case of engine outage.

FIG. 4 illustrates another example of determination of the safety point according to the invention in case of engine outage.

In an embodiment, the safety point 210 is characterized by taking into account a critical climb slope, one engine being out. A difference in climb angle is associated with the trajectory with all engines active and the trajectory with engine outage. The crossing height datum then makes it possible to define the altitude of a safety point.

An example of computation is described hereinbelow. The altitude of the safety point $Alt_y$ must be greater than the sum of the predefined crossing height $H_{def}$ (safety margin) and of the elevation (i.e. the height of the obstacle of the relief relative to sea level, a sum from which is subtracted the altitude difference $\Delta Alt$, which equals $\tan \alpha * d_{x2}$ (the angle $\alpha$ being associated with the situation in which one engine is out), with:

$$d_{x1} = \frac{(alt_{y[0:FL250]} - alt_0)}{\tan \alpha_{full\ engine}}$$

$$d_{x2} = D\ \text{obstacle}\ (D0) - d_{x1}$$

$d_{x2}$ corresponds to the distance (to the ground) flown in engine out condition, i.e. between the projection of the position of the aircraft when the outage occurs (at $D_{x1}$) and the position of the obstacle ($D_{obstacle}$, at its maximum height point).

Figure 5:
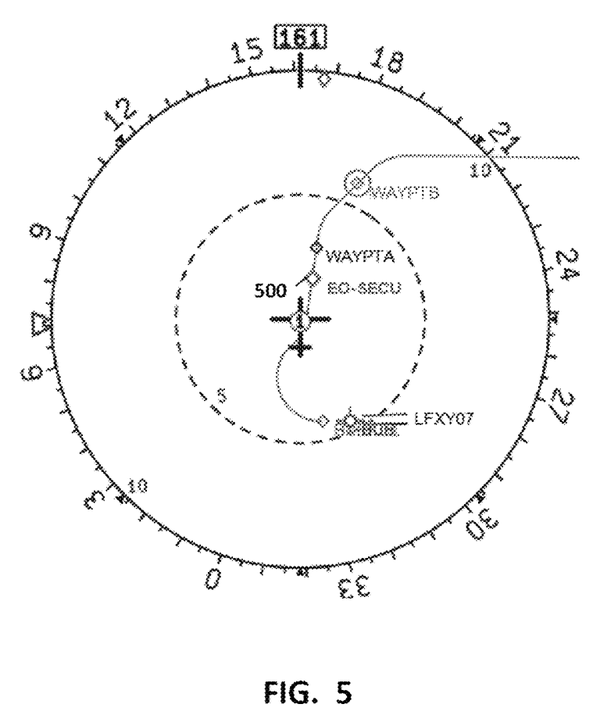
FIG. 5 illustrates an example of display of the safety point determined according to the invention, intended for the pilot.

FIG. 5 illustrates an example of display of the safety point determined according to the invention, intended for the pilot.

Different display modalities are possible (e.g. display of a symbol on the ND and/or VD, and/or display on the F-PLN page of the FMD). In particular, the safety point 210 can be named "EO-SECU" point 500 (Engine Out SECUre point).

Figure 6:
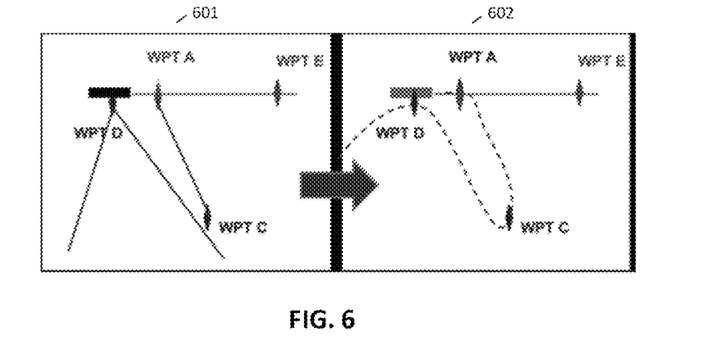
FIG. 6 illustrates examples of display of the EOSID procedure in the form of a "stick" trajectory on the one hand, and specifying lateral trajectory steps on the other hand.

FIG. 6 illustrates examples of display of the EOSID procedure in the form of a "stick" trajectory on the one hand, and detailing lateral trajectory steps on the other hand.

In an embodiment, the EOSID trajectory of the aircraft is displayed with steps. If an EOSID is defined, as long as there is no engine outage detected, the display of the EOSID trajectory is displayed in complete trajectory form (including the steps between the legs), and not in pseudo-trajectory form (stick trajectory).

The computation of the steps can be done by computing or determining predictions for the construction or the determination of the trajectory, or by taking into account engine outage hypotheses for the performance levels of the aeroplane along the EOSID trajectory (for example, the velocity is the maximum fineness velocity of the engine or engines out and the thrust is set to the number of engines active). The EOSID trajectory is computed fully, from the departure runway, with the steps between the legs.

Figure 7:
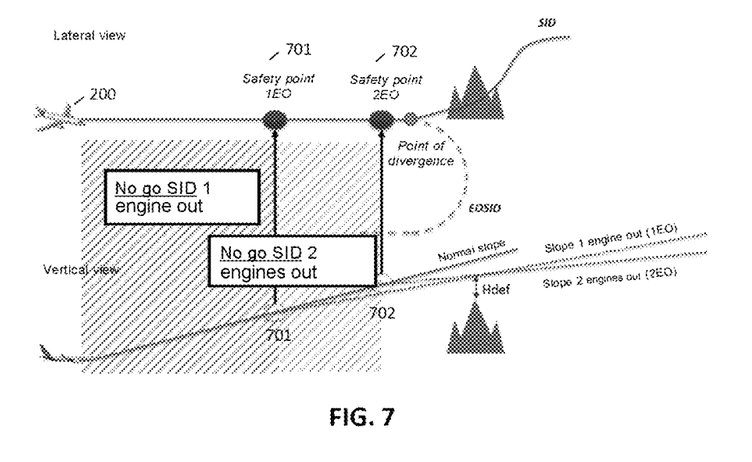
FIG. 7 illustrates the determination of several safety points in an engine outage situation.

FIG. 7 illustrates the determination of several safety points in an engine outage situation.

In an embodiment, several engine outage safety points are determined. For example, in the case where the aircraft is a three-engine aircraft (or one with more engines), several safety points can be computed according to the number of engines out (i.e. 1 EO, 2 EO, 3 EO, etc.). For example, the safety point 701 corresponds to the situation where one engine is out and the safety point 702 corresponds to the situation where two engines are out.

Figure 8:
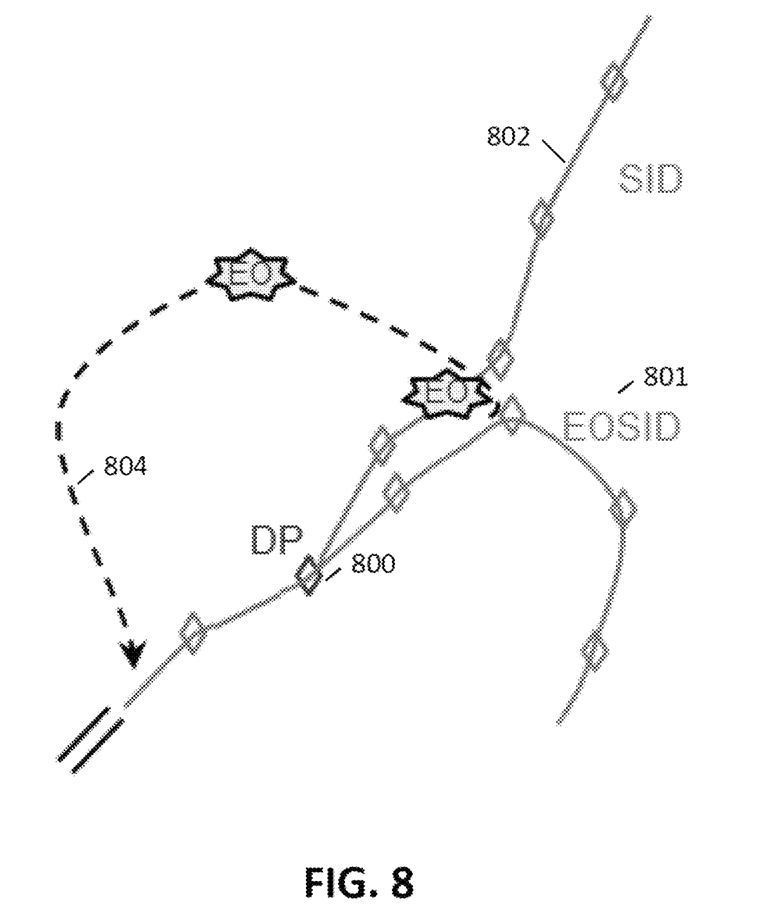
FIG. 8 illustrates an example of sequencing upon the automatic insertion of the EOSID procedure.

FIG. 8 illustrates an example of sequencing upon the automatic insertion of the EOSID procedure.

The figure shows the point of divergence 800, an EOSID trajectory 801 and an SID trajectory 802.

The dotted line trajectory 804 represents the fact that it is possible to be the current leg upon the engine-out on the first leg of the EOSID on insertion thereof (it is not a rejoining trajectory).

In an embodiment, the trajectory of the EOSID is inserted automatically, even after the point of divergence 800. In case of engine outage on take-off, a flight plan is proposed that makes it possible to rejoin the trajectory of the EOSID, and even if the point of divergence 800 is passed, leaving the choice to the pilot to accept or reject this trajectory. In an embodiment, the flight plan proposed linked to this trajectory is activated by or after the confirmation of the pilot. In an embodiment, the activation of the EOSID is possible during the flight of the departure procedure, whatever the position of the aeroplane relative to the point of divergence.

Examples of sequencing of the EOSID in the temporary flight plan, proposed after insertion of the EOSID, are described hereinbelow.

If the engine outage occurs before the point of divergence 800, then the trajectory of the EOSID is inserted from the point of divergence 800, followed by a discontinuity, then by the rest of the flight plan defined after the point of divergence. The vertical constraints associated with the legs of the EOSID are transferred to the legs of the SID from the active leg inclusive to the point of divergence.

If the engine outage occurs after the point of divergence 800, the TO waypoint is followed by a discontinuity, then by the trajectory of the EOSID from the point of divergence, then by a discontinuity and finally by the rest of the flight plan defined after the TO waypoint. Alternatively, the EOSID is inserted as a whole (from the runway), followed by a discontinuity and finally by the rest of the flight plan defined from the TO waypoint present before the activation of the EOSID.

In the case where the SID and the EOSID have no leg in common, the point of divergence is the departure runway. In this case, the EOSID is inserted from the departure runway.

In an embodiment, the pilot can create one or more EOSID trajectories. If necessary, the pilot can create one or more procedures that do not exist in the system database. These procedures optionally have the same automatic activation possibilities. Thus, the pilot can create his or her own procedure (i.e. with any type of legs) in a secondary flight plan and store the latter as EOSID associated with a runway. When the runway is selected, the EOSID procedure of the pilot will be proposed in case of engine outage.

It should be noted that, according to the current state of the art, only certain types of legs can be created by the pilot. In an embodiment of the invention, the pilot can create one or more legs from the following legs, in order to be able to construct procedures according to the invention.

CA: Course to an altitude—ex: INSERT NEXT WPT 090/9000 [CRS/ALT]

FA: Fix to an altitude—ex: INSERT NEXT WPT TOTO/080/8000 [WPT/CRS/ALT]

FA: Fix to an altitude—ex: INSERT NEXT WPT TOTO/080/8000 [WPT/CRS/ALT]

VA: Heading to an altitude—ex: INSERT NEXT WPT H090/8000 [HDG/ALT]

CD: Course to DME distance—ex: INSERT NEXT WPT 090/TOU/D10 [CRS/DME ident/DIST]

CF: Course to fix—ex: INSERT NEXT WPT 090/TOTO [CRS/WPT]

CR: Course to a radial termination—ex: INSERT NEXT WPT 120/TOU/R170 [CRS/VOR ident/radial]

In an embodiment, a secondary flight plan is determined that is specific to the EOSID. In effect, a secondary flight plan of "EOSID" type can be determined. Advantageously, this embodiment enables the pilot to prepare an EOSID flight plan in a secondary flight plan which will be automatically inserted (in the temporary flight plan) in case of engine outage.

In an embodiment of the invention, the segments of the EOSID portion (legs) can be displayed and/or edited, for example on the FMD (in the F-PLN for example). Advantageously, the pilot can modify the EOSID procedure.

In an embodiment of the invention, the EOSID can be activated without engine outage. It may in fact be that an engine outage is not detected and/or is not detected in useful time. Consequently, advantageously, the pilot can activate the EOSID procedure even if no engine outage is detected. In an embodiment, the pilot activates the EOSID procedure through a hardware interface (e.g. button present in the cockpit) and/or a software interface (e.g. via the HMIs).

Figure 9:
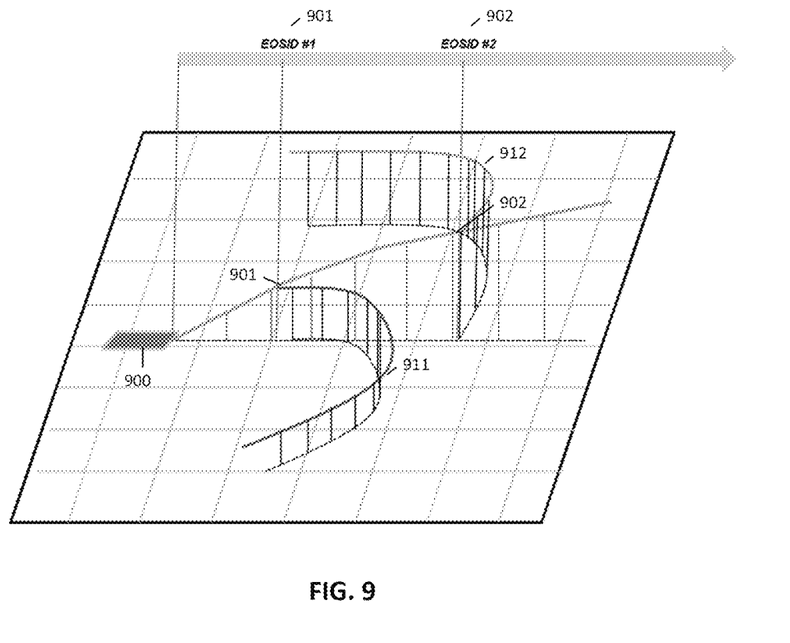
FIG. 9 illustrates an example of a trajectory comprising several EOSID trajectories for a same take-off runway.

FIG. 9 illustrates an example of a trajectory comprising several EOSID trajectories for a same take-off runway.

In an embodiment, several EOSIDs (for example EO point 901 and trajectory 911; EO point 902 and trajectory 912) can be determined for each runway 900.

By storing and by displaying several EOSID trajectories for a same runway according to the selected departure or the point of engine outage, one of the two EOSID trajectories will either be activated automatically (for example according to the point or the altitude of the outage) and/or can be selected by the pilot.

In an optional embodiment, an engine-out trajectory is associated with the "missed approach". Upon the activation of the "missed approach", the "EO-missed approach" is displayed and will be able to be inserted in case of engine outage.

In an optional embodiment, the "disarm point" according to ARINC 424 is displayed. The "disarm point" as defined in the A424 standard is indicated visually to the pilot, for example by the display of a label on the navigation display. The name of the point can be "DIS-PT" (DISarm PoinT).

Figures 10A, 10B:
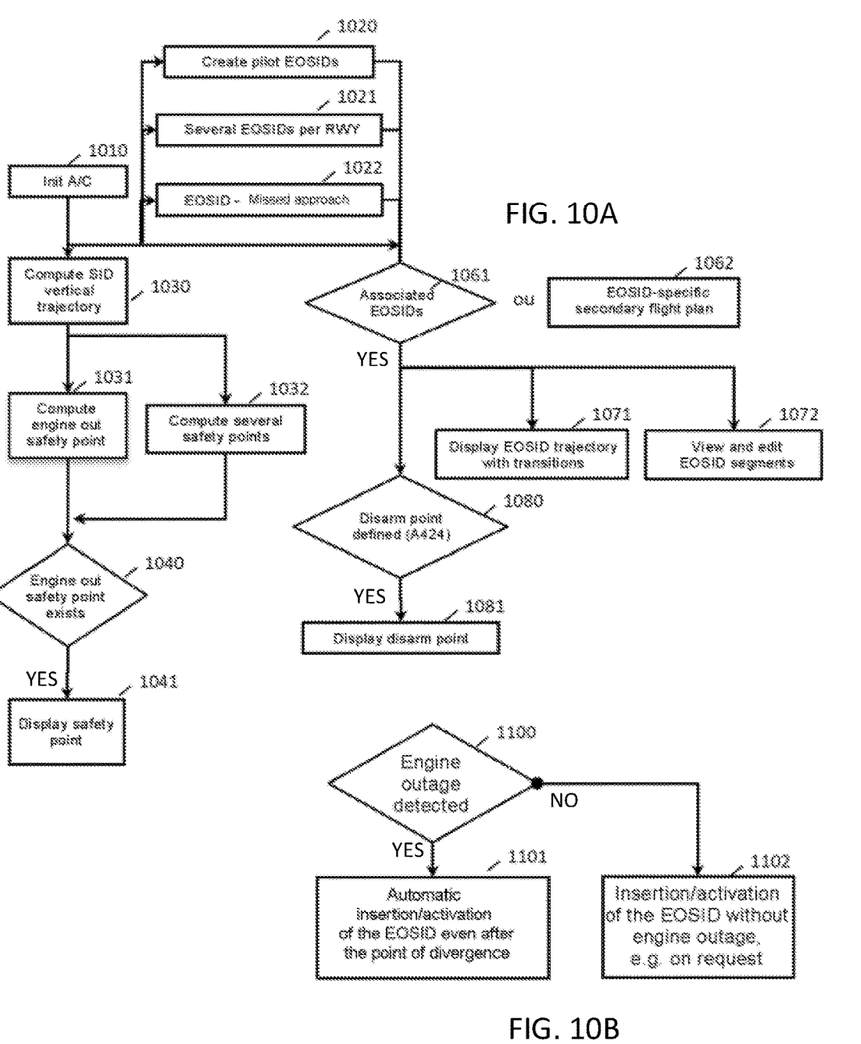
FIGS. 10A and 10B illustrate examples of steps of the method according to the invention.

FIGS. 10A and 10B illustrate examples of steps of the method according to the invention.

During the preparation of the flight 1010, the aeroplane performance levels and the take-off data are initialized. The system or the pilot can then create or select one or more EOSID trajectories 1020, and/or several EOSIDs for each take-off runway 1021 and/or an EOSID trajectory associated with the "missed approach" 1022. The take-off data 1010 make it possible to compute the vertical trajectory 1030 then determine the computation of the engine outage safety point 1031 (or else determine several safety points 1032, depending on whether one or more engines drop out). Depending on whether the engine outage safety point or points exist or not 1040, the safety point or points are displayed 1050 (for example on the navigation display). Depending on the EOSID trajectories 1020, 1021 and/or 1022 or EOSID trajectories contained in the system, the existing EOSID trajectories can be selected 1061 (or else an EOSID-specific secondary flight plan is created 1062). The resulting EOSID trajectory can be displayed (possibly with the steps) 1071. The pilot can view and/or edit EOSID segments on the FMD 1072. The "disarm point" can possibly be defined 1080 and displayed 1081.

If an engine outage is detected 1100, the EOSID can be inserted automatically 1101 even after the point of divergence, as long as the SID departure procedure is flown. The EOSID trajectory can also be inserted without engine outage 1102, for example on request from the pilot, while the SID departure procedure is being flown.

The invention claimed is:

1. A computer-implemented method for managing a trajectory of an aircraft comprising the steps of:
   receiving aeroplane performance levels of the aircraft;
   receiving a flight plan of the aircraft;
   receiving ground relief data associated with the flight plan;
   receiving weather data associated with the flight plan, the weather data comprising data on winds and/or temperatures associated with the flight plan;
   determining, by a computer, coordinates of at least one safety point according to the aeroplane performance levels, the data associated with the ground relief and the weather data, said at least one safety point making it possible to continue a flight of the aircraft according to a predefined SID landing trajectory in case of outage of one or more engines of the aircraft.

2. The computer-implemented method according to claim 1, wherein the step of determining, by a computer, the coordinates of at least one safety point comprising the steps of determining a position and an altitude of the aircraft relative to the relief, in receiving a value of a minimum safety height associated with a crossing of the relief, and in determining the performance levels of the aeroplane according to an engine outage and the weather data.

3. The computer-implemented method according to claim 1, further comprising the step of displaying at least one of said safety points.

4. The computer-implemented method according to claim 1, further comprising the step of receiving one or more EOSID trajectories in response to the receiving the aeroplane performance levels of the aircraft, an EOSID trajectory being associated with a take-off runway and/or with the SID trajectory.

5. The computer-implemented method according to claim 4, wherein an EOSID trajectory being selected from several according to predefined criteria.

6. The computer-implemented method according to claim 4, wherein a display of an EOSID trajectory comprises lateral trajectory steps.

7. The computer-implemented method according to claim 4, further comprising the step of inserting into a temporary flight plan or in activating in the current flight plan the one or more received EOSID trajectories.

8. The computer-implemented method according to claim 7, further comprising a step of detecting an engine outage and in revising the flight plan of the aircraft by inserting the temporary flight plan specific to an EOSID trajectory.

9. The computer-implemented method according to claim 4, further comprising a step of activating an EOSID trajectory in an absence of engine outage.

10. The computer-implemented method according to claim 4, further comprising a plurality of EOSID trajectories being associated with a predefined take-off runway and/or an SID trajectory.

11. The computer-implemented method according to claim 1, further comprising the step of detecting engine outages, and a plurality of safety points being determined, each safety point being associated with an increasing number of engines out.

12. The computer-implemented method according to claim 1, further comprising a step of detecting an engine outage, displaying a predefined point, called Disarm Point, and determining the activation of an EOSID trajectory in case of engine outage of the aircraft before this point on the flight plan.

13. A non-transitory computer program product, said non-transitory computer program product comprising code instructions which when executed by a computer perform the steps of claim 1.

14. A computerized system for implementing the steps of the method according to claim 1 comprising one or more FMD display screens and/or ND display screens and/or an electronic flight bag EFB.

15. The system according to claim 14, further comprising virtual reality head-mounted displays and/or augmented reality projectors.

16. A computer-implemented method for managing a trajectory of an aircraft comprising the steps of:
   receiving aeroplane performance levels of the aircraft with an electronic flight bag (EFB);
   receiving a flight plan of the aircraft with the EFB;
   receiving ground relief data associated with the flight plan with the EFB;
   receiving weather data associated with the flight plan with the EFB, the weather data comprising data on winds and/or temperatures associated with the flight plan;
   determining, by the EFB, coordinates of at least one safety point according to the aeroplane performance levels, the data associated with the ground relief and the weather data, said at least one safety point making it possible to continue a flight of the aircraft according to a predefined SID landing trajectory in case of outage of one or more engines of the aircraft.

17. The computer-implemented method according to claim 16, wherein the step of determining, by the EFB, the coordinates of at least one safety point comprising the steps of determining a position and an altitude of the aircraft relative to the relief, in receiving a value of a minimum safety height associated with a crossing of the relief, and in determining the performance levels of the aeroplane according to an engine outage and the weather data.

18. The computer-implemented method according to claim 16, further comprising the step of displaying at least one of said safety points on a display of the EFB.

19. A non-transitory computer program product, said non-transitory computer program product comprising code instructions which when executed by the EFB perform the steps of claim 16.

\* \* \* \* \*